J. O. HARRIS.
Lantern.
No. 59,717.
Patented Nov. 13, 1866.
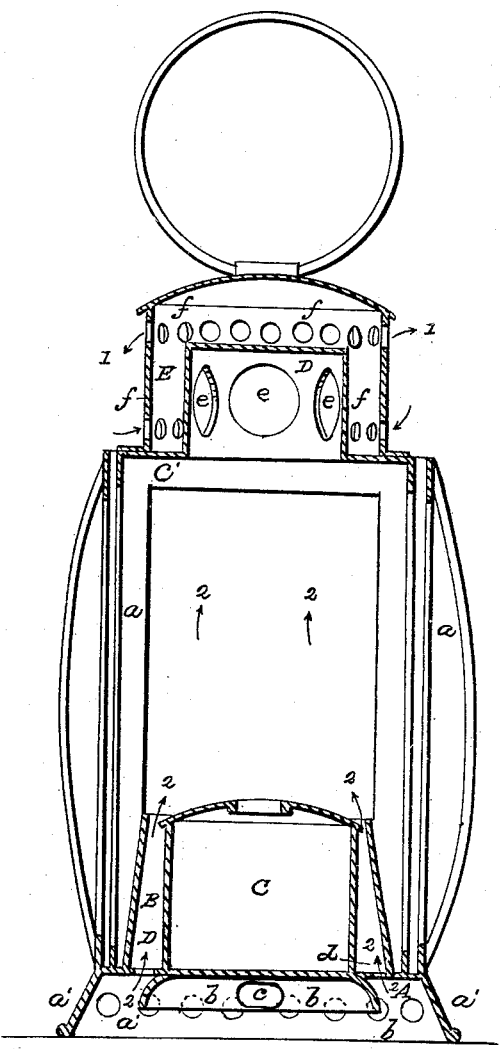

UNITED STATES PATENT OFFICE.

JOHN O. HARRIS, OF READING, PENNSYLVANIA, ASSIGNOR TO HIMSELF AND ISRAEL S. RITTER, OF SAME PLACE.

IMPROVEMENT IN LANTERNS.

Specification forming part of Letters Patent No. 59,717, dated November 13, 1866.

*To all whom it may concern:*

Be it known that I, JOHN O. HARRIS, of Reading, in the county of Berks and State of Pennsylvania, have invented a new and Improved Coal-Oil Lantern; and I do hereby declare that the following is a full, clear, and exact description thereof, which will enable others skilled in the art to make and use the same, reference being had to the accompanying drawing, forming part of this specification.

The drawing represents a vertical central section of my invention.

This invention relates to a modification of a coal-oil lantern for which Letters Patent were granted to me bearing date April 10, 1866.

The object of the invention is to admit of a cheap square or quadrilateral lantern being manufactured of tinned plate, which will embrace all the advantages of the original or patented lantern alluded to, the latter being constructed of brass.

The frame of the lantern consists of four upright angle-pieces, a, attached at their lower ends to a base, A, of square form, and having inclined sides a', perforated with holes b; and on the top of this base there is attached a conical chamber, B, which receives the lamp C, the latter being secured in the former by spring-catches c, or any suitable fastening.

Three of the sides of the lantern are composed of glass plates fitted between the uprights a, one side being of tinned plate, and the conical chamber B extends upward within the body of the lantern, the top of the base A being perforated with holes d, to admit air into the chamber B. The holes d in the inclined sides a' admit air within the base when the latter is placed upon any flat or plane surface, such as a floor, table, &c.

The upper ends of the upright angle-pieces a are attached to a horizontal plate, C', on which a cylindrical chamber, D, is secured, having opening e in its side, the lower end of D communicating with the interior of the lantern, D being open at its bottom.

This cylindrical chamber D is encompassed by a jacket, E, which is considerably larger in diameter than D, and is perforated by holes f at its upper and lower part, as shown clearly in the drawing. The space between the jacket E and chamber D forms a draft-chamber, the arrows 1 indicating the direction of the draft, and this draft augments the draft through the lantern, (indicated by the arrows 2.)

Thus, by this simple modification, I obtain all the advantages possessed by the more expensive brass-globe lantern previously patented. The same draft is obtained, and coal-oil may be used as a burning material, and a persistent flame obtained.

Having thus described my invention, I claim as new and desire to secure by Letters Patent—

A square or quadrilateral lantern having a square base, A, with perforated sides and a perforated top, with a conical chamber, B, attached, in combination with a top piece or cap composed of a cylindrical chamber, D, perforated with holes or openings e, and a jacket, E, encompassing D, and perforated at its upper and lower parts, substantially as and for the purpose set forth.

The above specification of my invention signed by me this 27th day of July, 1866.

JOHN O. HARRIS.

Witnesses:
WM. F. MCNAMARA,
ALEX. F. ROBERTS.